(12) United States Patent
LaSalle et al.

(10) Patent No.: US 7,870,187 B2
(45) Date of Patent: Jan. 11, 2011

(54) TRANSPORT AGNOSTIC PULL MODE MESSAGING SERVICE

(75) Inventors: Derek N. LaSalle, Redmond, WA (US); Kevin Bowen Smith, Sammamish, WA (US); Jean-Emile Elien, Bellevue, WA (US); Akash Jeevan Sagar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1409 days.

(21) Appl. No.: 10/750,191

(22) Filed: Dec. 31, 2003

(65) Prior Publication Data
US 2005/0198389 A1 Sep. 8, 2005

(51) Int. Cl.
*G06F 15/16* (2006.01)
(52) U.S. Cl. .................. 709/203; 709/206; 709/207; 709/219; 709/220; 709/238
(58) Field of Classification Search .................. 709/203, 709/207, 219, 206
See application file for complete search history.

(56) References Cited
U.S. PATENT DOCUMENTS
6,098,097 A * 8/2000 Dean et al. .................. 709/220

| | | | |
|---|---|---|---|
| 7,464,178 B2 * | 12/2008 | Corrigan et al. ............. 709/238 |
| 2003/0109271 A1 * | 6/2003 | Lewis et al. ................. 455/517 |
| 2004/0087300 A1 * | 5/2004 | Lewis ....................... 455/412.2 |
| 2004/0121789 A1 * | 6/2004 | Lindsey ....................... 455/517 |
| 2004/0165603 A1 * | 8/2004 | D'Angelo et al. ............ 370/401 |
| 2004/0230903 A1 * | 11/2004 | Elza et al. ..................... 715/513 |
| 2006/0106941 A1 | 5/2006 | Singhal et al. ............... 709/238 |
| 2006/0285692 A1 * | 12/2006 | Kerstens et al. .............. 380/270 |

OTHER PUBLICATIONS

Chen, Y-F. et al., "iMobile EE-An Enterprise Mobile Service Platform", *Wireless Networks*, 2003, 9, 283-297.
Cugola, G. et al., "Using Publish/Subscribe Middleware for Mobile Systems", *Mobile Computing and Communications Review*, 6(4), 25-33, 2002.
Rao, C-H.H. et al., "iMobile: A Proxy-Based Platform for Mobile Services", *ACM*, 2001, 3-10.

* cited by examiner

*Primary Examiner*—Barbara N Burgess
*Assistant Examiner*—Ario Etienne
(74) *Attorney, Agent, or Firm*—Woodcock Washburn LLP

(57) ABSTRACT

Transport agnostic pull mode messaging service enables clients of diverse types to send and receive messages to one another while guaranteeing delivery of messages. Client specific adapters connect to a server and pull messages waiting for them in a queue. Clients may specify themselves as the recipients of the pulled messages, or specify another client as a recipient. This allows users of diverse types of clients to communicate and provides users with greater flexibility regarding how, when, and where they view their messages.

25 Claims, 4 Drawing Sheets

US 7,870,187 B2

TRANSPORT AGNOSTIC PULL MODE MESSAGING SERVICE

FIELD OF THE INVENTION

This invention relates in general to the field of message delivery systems. More particularly, this invention relates to message reliability in the sending and requesting of messages.

BACKGROUND OF THE INVENTION

As technology advances, users are presented with a greater variety of devices that can send and receive messages. It is not uncommon for a typical office worker to send and receive messages on multiple devices including a telephone voice-mail system, a personal digital assistant (PDA), a cell phone using a small messaging service (SMS), and a personal email account. While the ability to send and receive messages from multiple sources and devices creates flexibility for the worker, it also creates additional problems. For example, a worker is now responsible for checking several different devices, adding both time, expense, and stress, and a user desiring to send a message to the worker must guess what device that worker is currently using in order to have a high likelihood that the worker will receive the message timely.

In addition, there is often no reliable way for the sender of a message to know if a recipient has received the message, which could lead to multiple copies of the same message being sent and received. In mission critical applications, duplicate messages can be problematic. For example, a user may submit an order to sell 100 shares of stock via email. If the user is unsure of its delivery, he may send it again. There is no reliable way for the recipient to tell if the user wanted two separate sales of 100 shares of stock, or if the second message containing the order was a duplicate.

Previous solutions to these problems have often been inflexible and limited to certain technologies. For example, programs exist to convert email to SMS for receipt on a cell phone. However, these solutions often do not allow the receiver of the message to choose where he receives the message; instead, they rely on the sender to designate where the message is sent. Further, these solutions provide no assurance to the sender that the messages were received and no indications to the recipient if a message was sent. In addition, they require the sender of the message to be aware of the technologies the recipient has for receiving messages.

In view of the foregoing, there is a need for messaging system that reliably ensures that messages are delivered and duplicate messages are deleted. In addition, there is a need to provide users with the ability to send and receive messages to other users without concern for the devices being used to receive those messages, and, additionally choose when and with what devices they then can receive their own messages.

SUMMARY OF THE INVENTION

The present invention provides a mechanism for transport agnostic pull mode messaging that guarantees message delivery.

According to an embodiment, a user of a client wishes to send a message to a particular endpoint. An endpoint can be an application, another user, or another client. The user client generates a unique message identification (such as a number) for the message and then sends the message along with the unique message identification to a server. The server can then respond to the client that the message with the unique message identification was received. If the client does not receive a response from the server within a specified time, the client resends the message and unique identification. After the server receives the message it looks for duplicate messages in the message store. If it finds no duplicates, it saves the message in the message store.

A user of a client wishes to receive some or all of his messages waiting to be delivered in the message store. The user wishes to receive his messages on the client he is using or at some other endpoint. The user client generates a message specifying the messages that the user desires to receive and the desired endpoint. The user client generates a unique message identification for the message and then sends the message along with the unique message identification to a server. The server can then respond to the client that the message with the unique message identification was received. If the client does not receive a response from the server within a specified time, the client resends the message and unique identification. The server then can retrieve the specified messages and send them to the specified endpoint.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Overview

The present invention is directed to transport agnostic pull mode messaging that enables clients of diverse type systems or devices to send and receive messages to one another while providing guaranteed delivery of messages. The exemplary systems and methods described herein overcome the problems of interoperability between different client devices and message delivery reliability found in current techniques and systems.

Client devices, such as email applications or cell phones, connect to a server and pull messages waiting for them in a queue. Clients can specify themselves as the recipients of the pulled messages, or specify another client as a recipient. Clients communicate with the server through client adapters. The client adapters are able to interact between the server and client by utilizing (and translating between) the particular protocols used by the clients and server. This allows users of diverse types of clients to communicate, and provides users with greater flexibility regarding how, when, and where they view their messages.

Exemplary Embodiments

Figure 1:
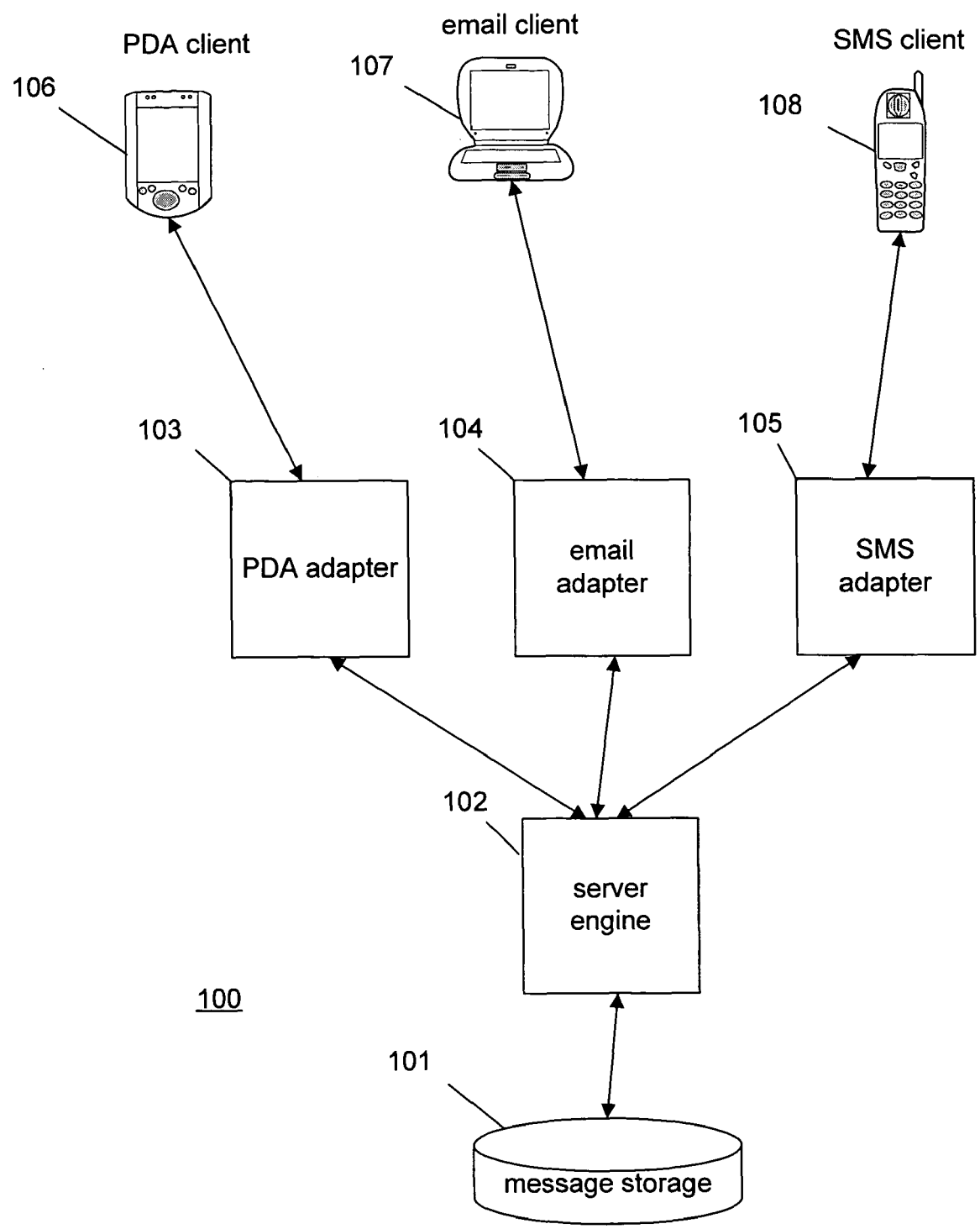
FIG. 1 is a block diagram of an exemplary system useful in describing the features of the present invention.

FIG. 1 depicts a block diagram of an exemplary embodiment of a transport agnostic pull mode messaging system 100 that permits messages to be sent, queued, and/or received by and between multiple different devices and formats in accordance with the present invention. A message storage 101, a server engine 102, a plurality of client adapters 103, 104, 105, and a plurality of client devices 106, 107, 108 are provided. The message storage 101 can be used to store messages sent and/or received by clients. Messages can comprise a message body, identification of the sender of the message, the endpoint destination of the message, and any other information that may be associated with a message. The endpoint can be a specific user, client device, or application, for example. Messages are stored until an instruction from the server engine 102 is received to delete the messages. It is appreciated that any method, system, or technique known in the art for data storage can be used.

The server engine 102 is used to communicate with the client adapters 103, 104, 105 and the message storage 101. The client adapters can request that the server engine 102 perform certain operations on the message storage 101. These operations can include adding, deleting, and/or retrieving messages from the message storage 101. It is appreciated that the server engine 102 allows flexibility in the underlying design of the message storage 201, as any changes to the message storage 101 are typically performed pursuant to modification of the server engine 102 and will not affect the operation of the client adapters.

There are a plurality of client adapters such as, for example, one for each of the supported client device types. The client adapters can act as an intermediary between the associated client devices and the server engine 102, and allow the client devices to interact with the server engine 102 without either the client devices or the server engine 102 using the same communication methods or protocols. It is appreciated that using client adapters for each supported client type may allow new clients to be easily added without requiring modification to the server engine 102 or to the client device itself. The client devices can be used to send and receive messages by users.

For illustrative purposes, three client adapters and three client devices are described with respect to the present example. For example, PDA adapter 103 is used to communicate between the PDA client 106 and server engine 102. PDA client 106 may be a typical personal digital assistant well known in the art. Similarly, email adapter 104 is used to communicate between the email client 107 and server engine 102. Email client 107 may be a typical email application, such as MICROSOFT®'s Outlook, which is well known in the art. Moreover, SMS adapter 105 is used to communicate between the SMS client 108 and server engine 102. SMS client 108 may be a typical cell phone device well known in the art.

A user of a PDA client 106 may desire to send a message to a particular endpoint. For purposes of illustration, PDA client 106 has been chosen, but it may be appreciated that any client may be used to send a message. An endpoint can be another user, application, or client of a different type, for example. In this example, assume the endpoint is SMS client 108.

In order to ensure that the message is received, the PDA client 106 can first generate a unique message identification (e.g., number or other identifier) for the message. It is appreciated that any method, system, or technique known in the art for generating a unique message identifier can be used. The purpose of this unique identifier is to ensure that the message has been received, and that any subsequent resubmissions will be treated as duplicates by the system. The unique identifier can be sent along with the contents of the message to the adapter associated with PDA client 106, which in this case is the PDA adapter 103.

In this exemplary embodiment, PDA adapter 103 may or may not receive the message sent by PDA client 106. If PDA adapter 103 receives the message, it can respond to PDA client 106 with a message stating that the message was received along with the unique identifier supplied by PDA client 106. If PDA adapter 103 does not receive the message, indicating that the message was lost in transmission, or if PDA client 106 does not receive the response, then after some specified time the original message along with the unique identifier can be resent by PDA client 106. The PDA client 106 will continue to resend the message and unique identifier until it receives a response from PDA adapter 103 indicating that the message was received.

In this exemplary embodiment, the PDA adapter 103 may have already sent a response to the message sent by PDA client 106. The message can now be sent by the PDA adapter 103 to the server engine 102. The PDA adapter 103 can be characterized as a communications layer between the server engine 102 that processes message requests, and the PDA client 106 that sends and requests messages. Each of the client devices can communicate using a different standard or protocol. It may be appreciated that it is cumbersome for the server engine 102 to communicate to client devices that utilize multiple standards or protocols. Therefore, each type of client can have an associated adapter (e.g., adapters 103, 104, 105) that allows for communications between the server engine 102 and each type of client. It may be appreciated that the use of client adapters modularizes the design of the server, and provides the ability to add new types of clients by creating a new adapter type.

The server engine 102 can now query the message storage 101 using the unique message identifier previously supplied by the PDA client 106 and a client identification number that may be associated with the client. Each client preferably has an identifier associated with it. The client identifier can be any number or other identification that uniquely identifies the client and distinguishes it from the other clients.

This query may search the message storage 101 for any messages that contain a matching unique message identifier and the client identifier that corresponds to PDA client 106. If message storage 101 returns any matches, then the server engine 102 desirably assumes that the current message is a duplicate and will not save the message. It may be appreciated that because the unique message identifier is only unique to a particular client, and not the system as a whole, using the client identifier along with the unique message identifier ensures no messages will be lost because of conflicting unique message identifiers.

If message storage 101 returns no results from the query, then server engine 102 can standardize the message for storage in the message storage 101. It may be appreciated that use of the adapter allows the client to communicate with the server engine 102, however the message can still need to be formatted or standardized for storage in the message storage 101. The message is desirably standardized into XML by the server engine 102. It may be appreciated that other systems, techniques or methods known in the art for message standardization may be used. The standardized message is then sent to message storage 101 to be stored for later retrieval by a client device.

In an exemplary embodiment, a user of the SMS client 108 may wish to receive some or all of the messages that may have been sent to him. These messages can reside in message storage 201, such as the message previously sent by a user of PDA client 106. The user can request these messages by sending a message to the SMS adapter 105 specifying that he wants to receive the messages, along with how he would like to receive the messages.

The user has several options regarding how his messages may be returned to him. In particular, the user can specify an endpoint at which the messages will be received. This endpoint can be the device the user is currently using, but can also be another endpoint such as another user or email client 107. For example, the user can have a large number of messages and would like to instead view them on email client 107. In addition, the user may wish to receive his messages on the device the user is currently using, but using a different protocol. For example, the user may have received his messages on his personal computer using email client 107, but may now wish to receive them on his personal computer using a web browser.

Assume a user of the SMS client 108 desires to read his messages on the SMS client 108. Accordingly, he can send a message to the SMS adapter 105 indicating that he wants to receive the messages at the SMS client 108. The SMS client 108 first generates a unique message identifier. The unique message identifier is used to ensure that the message is received by the SMS adapter 105, and to prevent the sending of duplicate messages. The SMS client 108 can now send the message with the unique message identifier to the SMS adapter 105 specifying that he wants to receive his messages at endpoint SMS client 108, along with whatever additional delivery options are available.

The SMS adapter 105 may receive the request from SMS client 108 requesting that the associated messages be sent to SMS client 108. The SMS adapter 105 can now send a message to the server engine 102, with the request for all messages with an endpoint of SMS client 108. The server engine 102 queries message storage 101 for messages that have a specified endpoint that matches SMS client 108. The message storage 101 returns all matching messages to the server engine 102. The server engine 102 can standardize the messages in the format required by the endpoint being transmitted to, in this case SMS client 108. As previously discussed, the messages are stored in message storage 101 as XML. The server engine 102 desirably converts the messages from XML into the format required by SMS client 108. The server engine 102 then sends those messages to the SMS adapter 105. The SMS adapter 105 can then send the messages along with the unique message identifier to the SMS client 108. Once the SMS client 108 receives the messages, it can display or otherwise provide them to the user.

The SMS client 108 may not receive the messages that it requested. This could be the result of the initial request sent to the SMS adapter 105 having been lost in transmission, or a result of the response from the SMS adapter 105 having been lost in transmission, for example. In either case, the SMS client 108, after some (preferably, user defined) timeout period, will resend the original message along with the original unique message identifier. Preferably, it will continue to resend the original message with the unique identifier until it receives a response from the SMS adapter 105 containing a matching unique identifier. Any duplicate responses that may arrive, identifiable from the unique message identifier, desirably will be ignored by the SMS client 108.

The user of the SMS client 108 may now have received his messages. Those messages can contain information that the user desires to send to an email application. For example, the messages contain text or attachments that the user may more easily view with an email application on a desktop computer. Assuming that the user of the SMS client 108 wants to forward specific messages to email client 207, he can send a message to the SMS adapter 105 to forward selected messages to the endpoint corresponding to the email client 107, along with a unique message identifier to ensure that the SMS adapter 105 has received the message.

Once the SMS adapter 105 receives the message, it can send a reply to the SMS client 108 indicating that it has received the message. The SMS client 108 can resend the message if it has not received a reply within a (preferably, user specified) timeout period.

The SMS adapter 105 may send a message to the server engine 102 to forward the specified messages to email client 107. The server engine 102 can query for the specified messages from the message storage 101. The server engine can then make copies of the received messages, and can change the destination of the messages to endpoint email client 107. The server engine 102 can now save the new messages in the message storage 101. The messages then wait in the message storage 101 for the email client 107 to request or otherwise access them.

Figure 2:
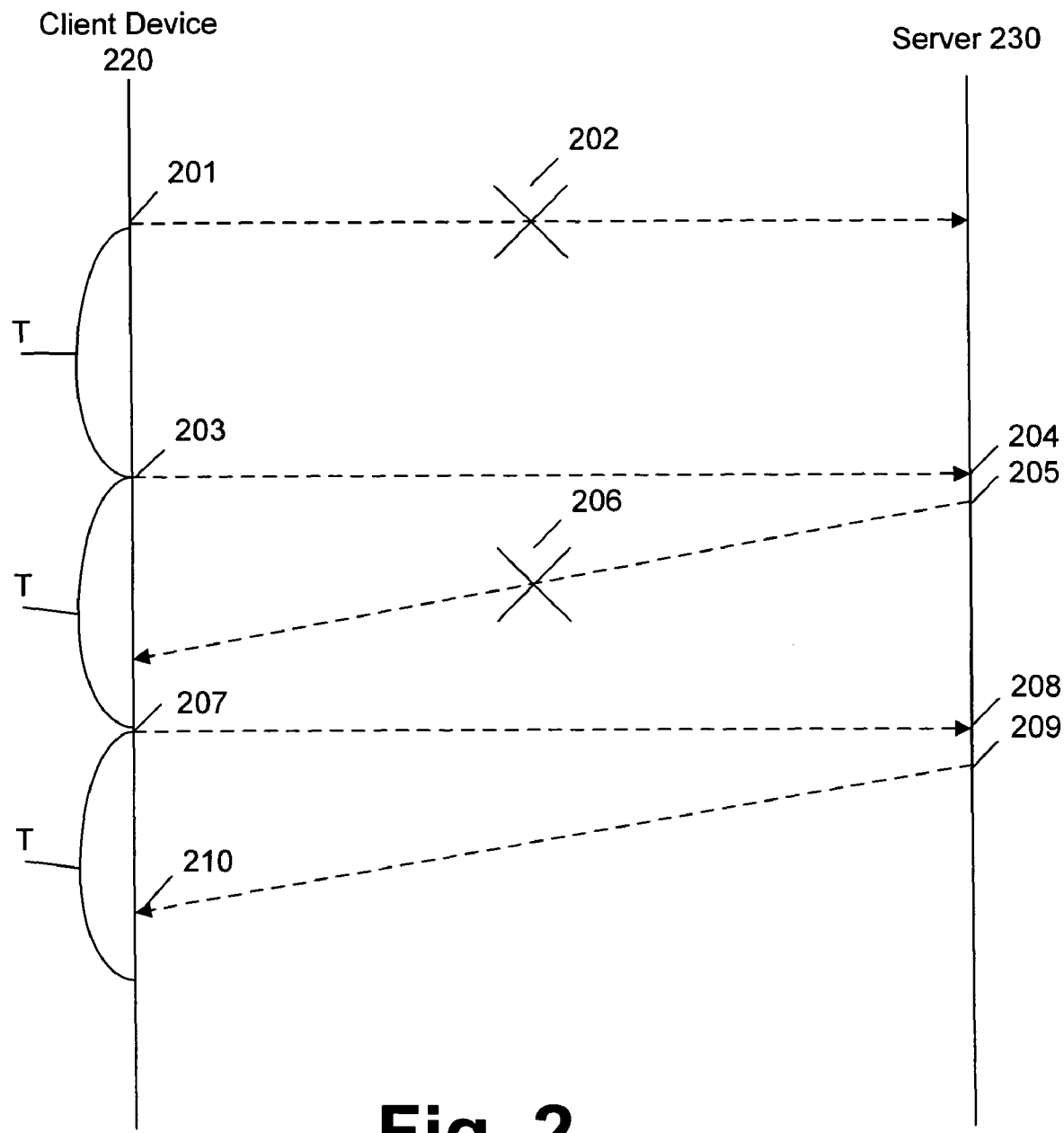
FIG. 2 is a diagram useful in describing an exemplary method of ensuring message delivery between a client and server in accordance with the present invention.
Figure 3:
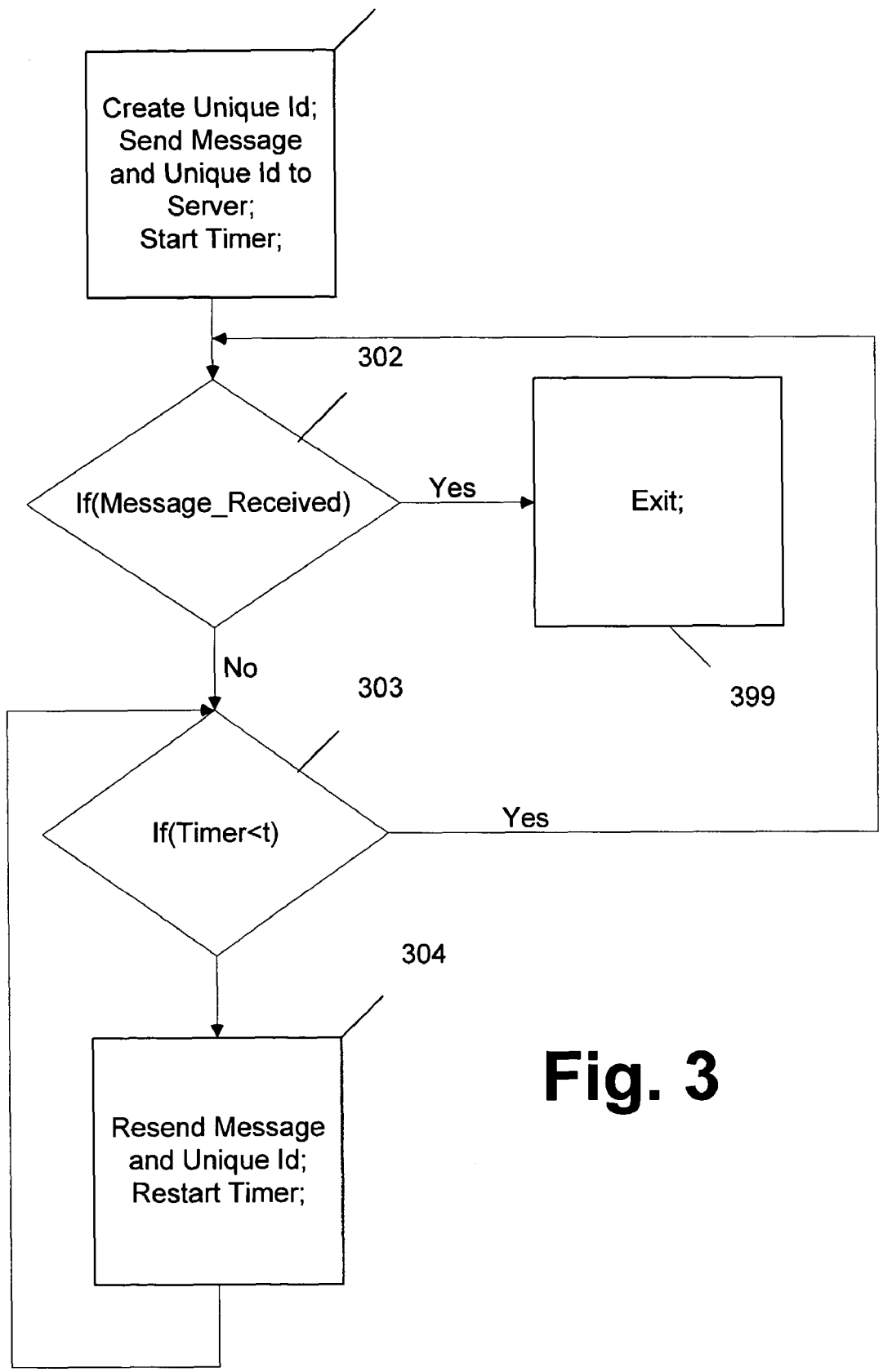
FIG. 3 is a flow chart of an exemplary method of ensuring message delivery between a client and server in accordance with the present invention.

FIG. 2 is an example of ensuring message delivery between a client and server, and FIG. 3 is a corresponding flow chart of an exemplary method of ensuring message delivery, in accordance with the present invention.

Assume client device 220 desires to send a message to server 230. This message can be sent for a variety of purposes, such as, for example, to relay information that the sender wishes to be received by another user, or to request messages queued by the server be delivered. Before sending the message, the client device 220 generates, or otherwise request and receive, a unique message identifier, such as an identification number. It is contemplated that the unique message identification is generated using any method, system or technique known in the art for associating a unique identifier with a message.

At 201, the client device 220 sends the message along with the unique message identification to server 230. 201 is further illustrated with respect to step 301 in FIG. 3. At step 301, a unique message identification is generated and sent along with the message to a server. In addition, a timer is started to count the elapsed time since the message was sent. It is appreciated that any method, system, or technique known in the art for keeping time may be used.

As illustrated at 202, the message sent to server 230 is not received for a variety of reasons, some of which have been described above with respect to FIG. 1. After some specified timeout time ('t') which may be predetermined and/or user programmable, client device 220 determines that it has not received a response to the message from server 230. At 203, the client device 220 resends the message along with the unique message identification. At 204, server 230 receives the message and can now carry out the instructions contained in the message.

203 and 204 are further illustrated with respect to steps 302-304. At step 302, it can be determined if a matching response to the message has been received by checking a variable, such as "message_received", which is preferably a flag variable that is set to indicate if a matching message has been received. It may be appreciated that any method, technique, or system known in the art for determining if a message has arrived can be used. If the message was received, then processing continues at step 399 where the routine exits. If the message was not received, processing continues at step 303.

At step 303, it is determined if the maximum time t has elapsed since the original message has been sent, indicating that the message should be sent again. The current value of the timer is compared to t. If the timer value is less than t, the process returns to step 302; otherwise, the process continues at step 304.

At step 304, it is determined that the maximum time t has elapsed, and the client resends the original message and unique message identification. The timer is also desirably reset so that it may be later determined if the message should be resent again.

Returning to FIG. 2, as illustrated at 205, server 230 sends a response to client device 220 that it has received the message. In the response, server 230 can include the unique message identification sent with the message that it is responding to.

At 206, the response sent to client device 230 is not received for a variety of reasons, some of which are described above. Then, at 207, time t elapses and client device 220 determines that it has not received a response to the original message. Client device 220 may not know that the message was in fact received. Thus, client device 220 resends the message along with the unique message identification. 206 and 207 are further illustrated in FIG. 3 with respect to steps 302-304, described above.

At 208, server 230 may receive the message that was sent as a duplicate at 207. The server 230 recognizes that it had previously received a message with the same unique message identification from client device 220, and therefore has already carried out the instructions contained in the message. Accordingly, server 230 can assume that the message it sent at 205 was not received. At 209, server 230 can resend the response to the message that it originally sent at 205.

At 210, the client device 220 may receive the response from server 230. The client device 220 determines that the response contains the same unique message identification as the message sent to server 230. The client device 220 can now conclude that the message was received and acted on by the server 230.

210 is further illustrated at steps 302 and 399. At step 302 it is determined if a matching response to the message has been received by checking the variable message_received. A flag variable message_received has been set to indicate if a matching message was received. It may appreciated that any method, technique, or system known in the art for determining if a message has arrived may be used. If the message was received than the processes may go step 399. If the message was not received, the process may go to step 303. At step 399, it may already have been determined that a response was received, the process may then exit.

Exemplary Computing Environment

Figure 4:
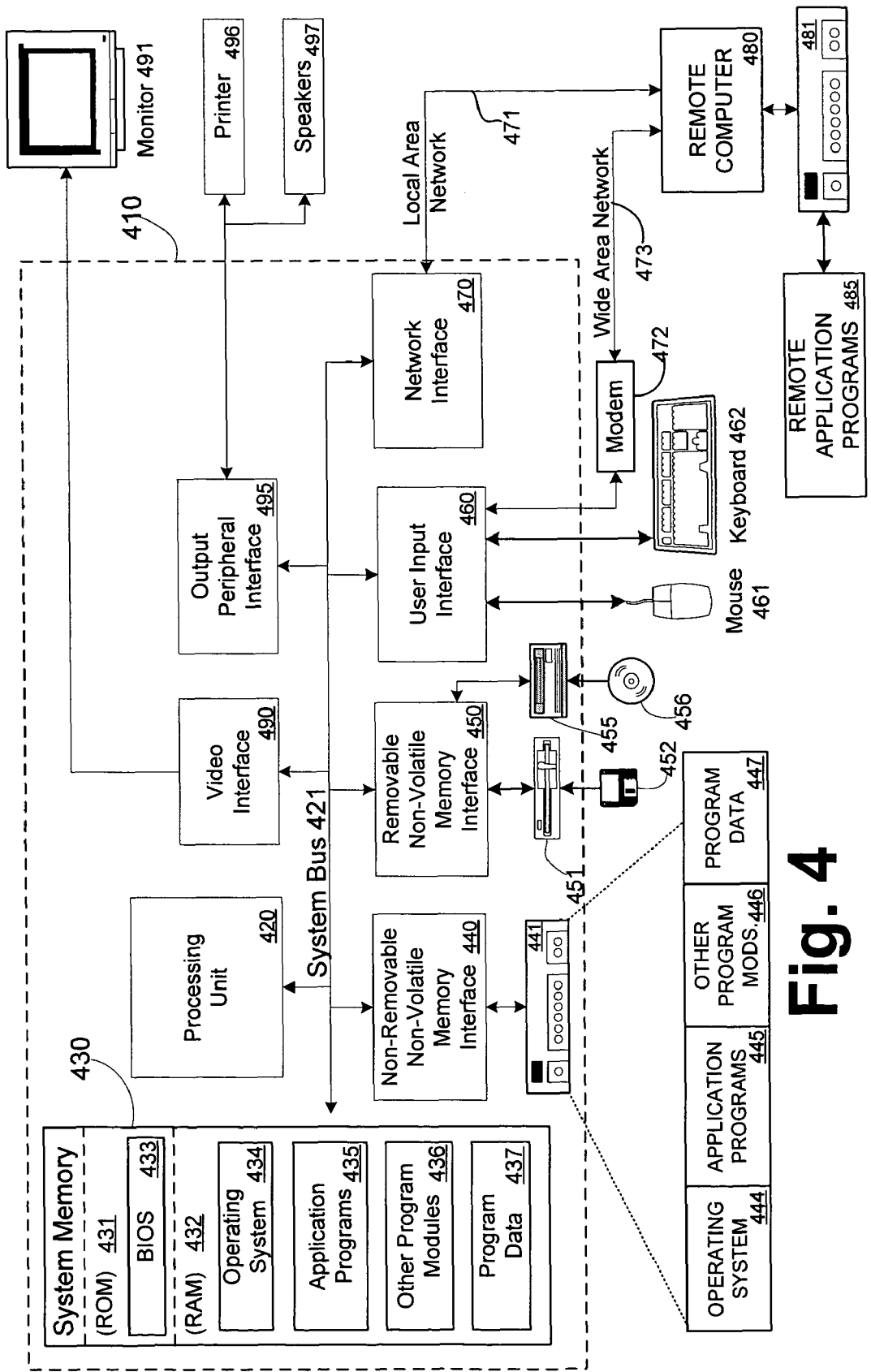
FIG. 4 is a block diagram showing an exemplary computing environment in which aspects of the invention may be implemented.

FIG. 4 illustrates an example of a suitable computing system environment 400 in which the invention may be implemented. The computing system environment 400 is only one example of a suitable computing environment and is not intended to suggest any limitation as to the scope of use or functionality of the invention. Neither should the computing environment 400 be interpreted as having any dependency or requirement relating to any one or combination of components illustrated in the exemplary operating environment 400.

The invention is operational with numerous other general purpose or special purpose computing system environments or configurations, such as for example, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

With reference to FIG. 4, an exemplary system for implementing the invention includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer 410 typically includes a variety of computer readable media, and includes both volatile and non-volatile media, removable and non-removable media.

The system memory 430 includes computer storage media in the form of volatile and/or non-volatile memory such as ROM 431 and RAM 432. A basic input/output system 433 (BIOS), containing the basic routines that help to transfer information between elements within computer 410, such as during start-up, is typically stored in ROM 431. By way of example, and not limitation, FIG. 4 illustrates operating system 434, application programs 435, other program modules 436, and program data 437.

The computer 410 may also include other removable/non-removable, volatile/non-volatile computer storage media. By way of example only, FIG. 4 illustrates a hard disk drive 441 that reads from or writes to non-removable, non-volatile magnetic media, a magnetic disk drive 451 that reads from or writes to a removable, non-volatile magnetic disk 452, and an optical disk drive 455 that reads from or writes to a removable, non-volatile optical disk 456. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. A user may enter commands and information into the computer 410 through input devices such as a keyboard 462 and pointing device 461, commonly referred to as a mouse, trackball or touch pad. These and other input devices are often connected to the processing unit 420 through a user input interface 460 that is coupled to the system bus, but may be connected by other interface and bus structures. A monitor 491 or other type of display device is also connected to the system bus 421 via an interface, such as a video interface 490. In addition to the monitor, computers may also include other peripheral output devices such as speakers 497 and printer 496, which may be connected through an output peripheral interface 495.

The computer 410 may operate in a networked environment using logical connections to one or more remote computers, such as a remote computer 480. The remote computer 480 may be a personal computer, a server, a router, a network PC, a peer device or other common network node, and typically includes many or all of the elements described above relative to the computer 410, although only a memory storage device 481 has been illustrated in FIG. 4. The logical connections depicted include a LAN 471 and a WAN 473, but may also include other networks.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the internet. The modem 472, which may be internal or external, may be connected to the system bus 421 via the user input interface 460, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

As mentioned above, while exemplary embodiments of the present invention have been described in connection with various computing devices, the underlying concepts may be applied to any computing device or system. The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for transport agnostic pull mode messaging comprising:
    a plurality of first clients of a user, each first client for sending a corresponding first message to a corresponding first adapter using a corresponding first communication protocol, receiving a corresponding response from the corresponding first adapter using the corresponding first communication protocol indicating that the corresponding first message was received, and resending the corresponding first message to the corresponding first adapter using the corresponding first communication protocol if the response from the corresponding first adapter is not received within a predetermined time period, the corresponding first message being destined for a common server engine, specifying particular ones of electronic communications to the user as already received and stored by the common server engine, and also specifying an endpoint comprising another, differing first client of the user;
    the corresponding first adapter for each first client, each corresponding first adapter receiving the corresponding first message and sending the response to the corresponding first client using the corresponding first communication protocol indicating that the corresponding first message was received, generating a corresponding second message based on the corresponding first message, and sending the corresponding second message to the common server engine using a common second communication protocol;
    the common server engine for:
        receiving each corresponding second message and executing at least one instruction based on the received corresponding second message, the at least one executed instruction including a query derived from the corresponding second message for the particular ones of electronic communications to the user as specified in the corresponding first message and as already received and stored by the common server engine;
        retrieving from a storage device the particular ones of the electronic communications to the user according to the query and sending the retrieved electronic communications to the endpoint as specified in the corresponding first message, the endpoint being identified by the user in the corresponding first message by way of an identifier of the endpoint; and
        determining the endpoint from the identifier thereof from the corresponding second message and storing the retrieved electronic communications in a queue corresponding to the determined endpoint, the determined endpoint accessing the queue and pulling the stored electronic communications therefrom; and
    a message storage for storing data associated with each corresponding second message,
    the corresponding first communication protocol corresponding to each corresponding first client being different from the first communications protocol corresponding to every other first client, each corresponding first adapter being constructed to communicate with the corresponding first client according to the corresponding and differing first communication protocol, every first adapter being constructed to communicate with the common server engine according to the common second communication protocol, each corresponding first adapter being local to the common server engine and remote from the corresponding first client.

2. The system of claim 1, further comprising:
a second client for receiving a third message from a second adapter using a third communication protocol; and
a second adapter for receiving a fourth message from the server engine using the protocol, generating a third message based on the fourth message, and sending the third message to a second client using a third communication protocol.

3. The system of claim 2, wherein the common second communication protocol is different from the third communication protocol.

4. The system of claim 2, wherein the third communication protocol is different from the corresponding first communication protocol.

5. The system of claim 1, wherein the at least one instruction comprises an instruction for storing data associated with the corresponding second message in a storage device.

6. The system of claim 5, wherein one of the server engine and the adapter determines if the corresponding second message is a duplicate message already stored, and if so, rejects the corresponding second message.

7. The system of claim 5, wherein the storage device comprises a queue associated with an endpoint.

8. The system of claim 7, wherein the endpoint is associated with the first client.

9. The system of claim 7, wherein the endpoint is associated with at least one of a user, a client, and an application different from the client.

10. The system of claim 1, wherein the first client generates the corresponding first message prior to sending the corresponding first message, the corresponding first message comprising a unique message identifier.

11. The system of claim 1, wherein the corresponding first adapter or the common server engine determines if the received corresponding first message is a duplicate of an already received message.

12. The system of claim 1, wherein the first client device generates a first client device specific unique identifier corresponding to the corresponding first message, stores the first client specific identifier, and sends the first client device specific identifier along with the corresponding first message to the corresponding first adapter.

13. The system of claim 1, wherein the response comprises a first client specific unique message identifier, and the first client verifies that the received response comprising the first client device specific identifier corresponds to a stored first client device specific identifier.

14. The system of claim 1, wherein the corresponding first communication protocol is different from the common second communication protocol.

15. A method for transport agnostic pull mode messaging comprising, with respect to each of a plurality of clients of a user:
sending a corresponding first message from a first client of the user to a corresponding adapter using a corresponding first communication protocol, the corresponding first message being destined for a common server engine, specifying particular ones of electronic communications to the user as already received and stored by the common server engine, and also specifying an endpoint comprising another, differing first client of the user;
receiving the corresponding first message at the corresponding adapter;
sending a response to the corresponding first message from the corresponding adapter to the first client using the corresponding first communication protocol, the response to the corresponding first message indicating that the corresponding first message was received;
receiving the response to the corresponding first message at the first client;
resending the corresponding first message from the first client to the corresponding adapter if the response to the corresponding first message from the corresponding adapter is not received at the first client within a predetermined time period;
generating a corresponding second message at the corresponding adapter based on and corresponding to the corresponding first message;
sending the corresponding second message from the corresponding adapter to the common server engine using a common second communication protocol; and
executing at least one instruction at the common server engine based on the corresponding second message, the at least one executed instruction including a query derived from the corresponding second message for the particular ones of electronic communications to the user as specified in the corresponding first message and as already received and stored by the common server engine, the at least one executed instruction retrieving from a storage device the particular ones of the electronic communications to the user according to the query and sending the retrieved electronic communications to the endpoint as specified in the corresponding first message, the endpoint being identified by the user in the corresponding first message by way of an identifier of the endpoint, the common server engine for determining the endpoint from the identifier thereof from the corresponding second message and storing the retrieved electronic communications in a queue corresponding to the determined endpoint, the determined endpoint accessing the queue and pulling the stored electronic communications therefrom;
the corresponding first communication protocol corresponding to each client being different from the corresponding first communications protocol corresponding to every other client, each corresponding adapter being constructed to communicate with the corresponding client according to the corresponding and differing first communication protocol, every adapter being constructed to communicate with the common server engine according to the common second communication protocol, each corresponding adapter being local to the common server engine and remote from the corresponding client.

16. The method of claim 15, wherein the corresponding first communication protocol is different from the common second communication protocol.

17. The method of claim 15, wherein executing the at least one instruction comprises storing data associated with the corresponding second message in a storage device.

18. The method of claim 17, wherein storing the data in the storage device comprises:
determining if the corresponding second message is a duplicate message already stored; and
rejecting the corresponding second message if it is a duplicate.

19. The method of claim 17, wherein the storage device comprises a queue associated with an endpoint.

20. The method of claim 19, wherein the endpoint is associated with the first client.

21. The method of claim 19, wherein the endpoint is associated with at least one of a user, a client, and an application different from the client.

22. The method of claim 15, further comprising generating the corresponding first message prior to sending the corresponding first message, the corresponding first message comprising a unique message identifier.

23. The method of claim 15, further comprising determining at the corresponding adapter or the common server engine if the received corresponding first message is a duplicate of an already received message.

24. The method of claim 15, wherein sending the corresponding first message from the first client to the corresponding adapter comprises:

generating a client specific unique identifier corresponding to the corresponding first message;

storing the client specific unique identifier; and sending the client specific unique identifier along with the corresponding first message to the corresponding adapter.

25. The method of claim 15, wherein the response comprises a client specific unique message identifier, and further comprising verifying the received response comprising the client specific unique identifier corresponds to a stored client specific unique identifier.

* * * * *